Oct. 14, 1924. 1,511,228

T. LUND

ART OF MAKING WELTING

Filed July 26, 1918 2 Sheets-Sheet 1

INVENTOR
Thomas Lund

INVENTOR-
Thomas Lund

Patented Oct. 14, 1924.

1,511,228

UNITED STATES PATENT OFFICE.

THOMAS LUND, OF BEVERLY, MASSACHUSETTS, ASSIGNOR TO UNITED SHOE MACHINERY CORPORATION, OF PATERSON, NEW JERSEY, A CORPORATION OF NEW JERSEY.

ART OF MAKING WELTING.

Application filed July 26, 1918. Serial No. 246,846.

*To all whom it may concern:*

Be it known that I, THOMAS LUND, a citizen of the United States, residing at Beverly, in the county of Essex and State of Massachusetts, have invented certain Improvements in the Art of Making Welting, of which the following description, in connection with the accompanying drawings, is a specification, like reference characters on the drawings indicating like parts in the several figures.

This invention relates primarily to the art of making welting and particularly that class of welting which is used in the manufacture of mock welt or McKay welt shoes. Certain features of the invention, however, are also capable of use in the manufacture of rands or of other articles in strip form.

At the present time it is a common practice to make welts or rands from a sheet of material by dividing a strip from the sheet and then splitting the strip by a diagonal cut into two welts or rands. Sometimes two separate machines are used for these two operations but there are machines upon the market which perform both operations at one handling of the material. Even in the latter case, however, when a wide sheet is to be cut up into thirty-two beveled rands, for example, it is necessary to pass the sheet through such a machine no less than sixteen times.

Hence, one principal object of the present invention is to provide a machine capable of producing a large number of beveled welts or rands by passing a relatively wide sheet of material just once through the machine. However, the invention comprises, in addition, novel mechanism and combinations of parts which may be embodied also in machines of the general type above mentioned in which one strip at a time is separated from the wide sheet.

In order to facilitate the laying of welting approximately flat around the curved edge of a sole, it is a common practice to slit or slash one edge of the welting, thus producing a series of tongues which when the welting is bent in the direction of its width will slide over each other and reduce the tendency of the welting to buckle at its curved edge.

Another important feature of the present invention, therefore, relates to a novel mechanism for slashing welting and also to the relative arrangement of the slashing mechanism in the machine.

Accordingly, the invention in one aspect comprises a machine having a work support and a cutter constructed and arranged to produce a series of slashes between the edges of a sheet of material in combination with another cutter for subsequently dividing the sheet at an acute angle to its surface along the area so slashed and mechanism for feeding the work transversely of said slashes. The slashes thus formed, as herein illustrated, are inclined in two directions relative to the line of feed. In a preferred form of the invention, one cutter first produces a series of slashes between the edges of a sheet of material and thereafter two other cutters separate a slashed strip from the sheet and divide the strip along its slashed area, thus forming two welts from each strip.

Moreover, the invention comprises, in addition to the machine above described, a process, which may be practised by the use either of such a machine or of a series of simple machines or hand knives, comprising slashing a wide sheet of material between its edges and then dividing it into a plurality of strips by alternate perpendicular and inclined cuts. In still another aspect the invention comprises first slashing a sheet between its edges, then dividing the sheet into strips each of a width sufficient for two finished welts and then dividing each strip along the median line of its slashed area.

Furthermore, the invention embraces also other combinations and arrangements of parts, combinations of steps and certain details of construction which will now be described in detail in connection with the accompanying drawings and will be pointed out in the claims.

Figure 1:
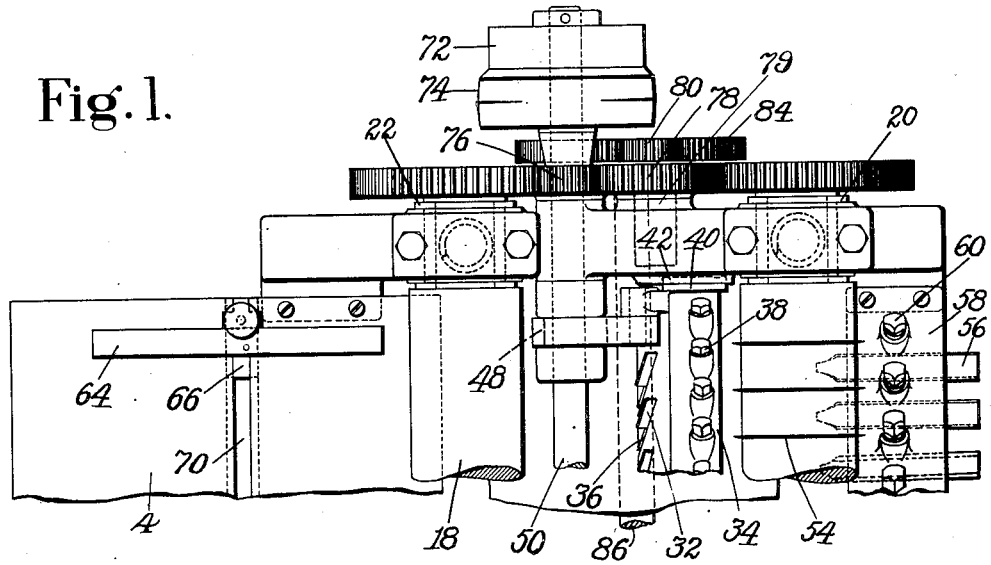
Fig. 1 is a plan of the driving end of a machine embodying the invention.
Figure 2:
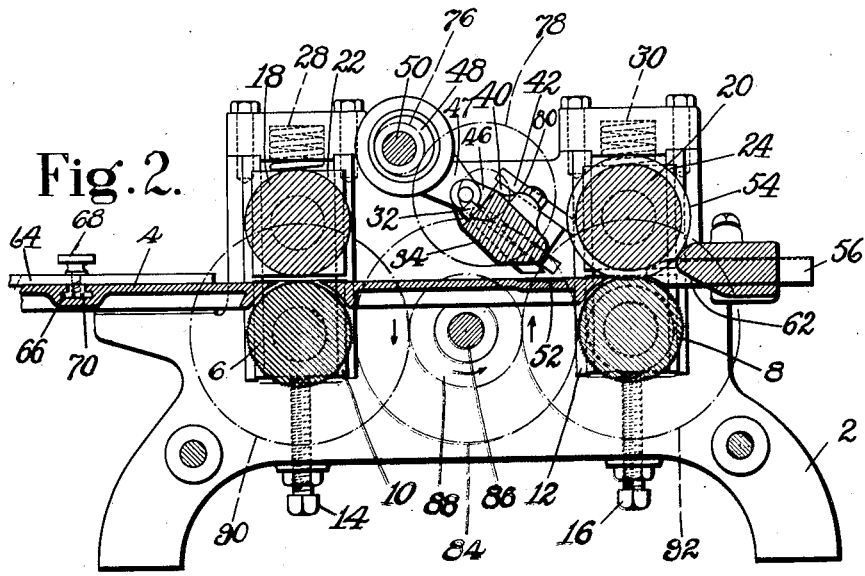
Fig. 2 is a central longitudinal sectional elevation of the machine.

As illustrated, the machine comprises a supporting frame 2, a flat work table 4 and lower corrugated feed rolls 6, 8, supported in bearing blocks 10, 12 which may be adjusted vertically by screws 14, 16. Co-operating with the feed rolls 6, 8 are two pressure rolls 18, 20 likewise supported in bearing blocks 22, 24 which, however, as shown in Fig. 2, may move away from the feed rolls against both gravity and the resistance of springs 28, 30, to accommodate different thicknesses of stock.

Figure 4:
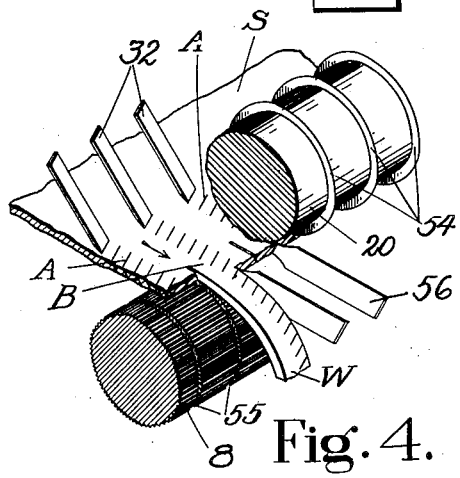
Fig. 4 is a perspective view of the principal operating mechanisms of the machine.

As a wide sheet of material, designated S in Fig. 4, is fed through the machine it is first operated upon by a series of slashing knives or cutters 32 carried by a bar or crosshead 34. Each knife, as shown, is adjustably and removably clamped in a kerf or slot 36 in the bar by a screw 38. The bar at each end is shaped as a slide 40 to reciprocate in a guideway 42 on the frame 2. A lug 46 at each end of the crosshead is pivotally connected to the strap 47 of an eccentric 48 secured to the driving shaft 50. The table 4 may be provided with a series of shallow recesses or slits 52 to receive the ends of the slashing knives 32. As clearly shown in the drawings, the knives 32 are so arranged and operated that they will produce a plurality of independent series of slashes A between the longitudinal edges of the sheet S as it is fed through the machine from left to right. These slashes extend angularly through the sheet and, also, preferably, angularly crosswise of the sheet (see particularly Fig. 5).

After the sheet has thus been slashed, it is divided into one half as many strips B as the number of welts, ultimately to be produced, by means of a series of stripping knives 54 peripherally arranged upon the pressure roll 20. The feed roll 8 is peripherally recessed or slit as at 55 to receive the knives 54. Immediately after such stripping, each strip B is divided angularly along the median line of its slashed area by fixed splitting knives 56 clamped in a supporting bar 58 by screws 60 in a manner similar to that already described in connection with the slashing knives 32. It will be noted that the under rear side of the bar 58 is beveled at 62 to guide the finished welting W downward out of the machine. At the entrance side of the feed rolls and at one end of the machine is provided an edge gage 64 which is secured to a rabbeted sliding block 66 which may be clamped in adjusted position by a thumb screw 68, the block being adjustable in a correspondingly shaped groove 70 in the work table 4.

Figure 3:
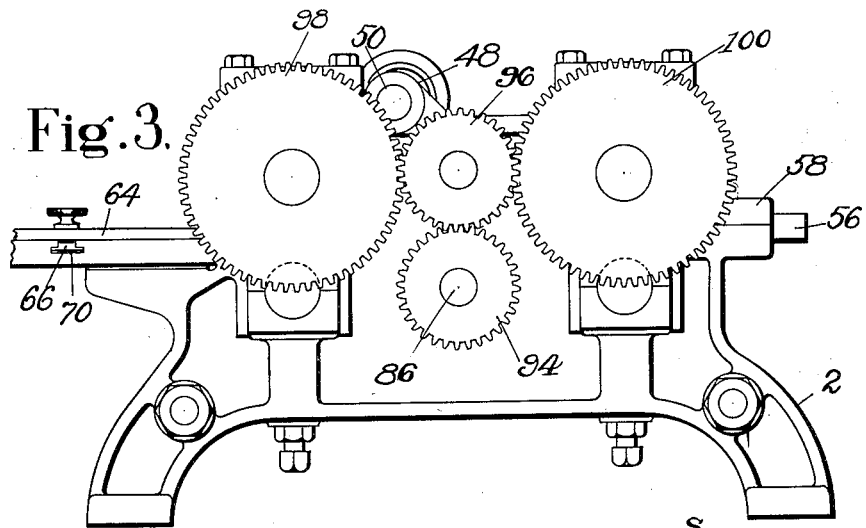
Fig. 3 is an elevation of the end of the machine opposite to that shown in Fig. 1.

For driving the machine, the shaft 50 is provided with loose and tight pulleys 72, 74 and also with a small gear 76 meshing with a larger gear 78 on a stub shaft 79 supported in the frame 2 and carrying also a gear 80 which, in turn, meshes with a large gear 84 secured to a transverse shaft 86 carrying a smaller gear 88 meshing with gears 90, 92 which are secured to and rotate with the lower feed rolls 6, 8, respectively. The upper pressure rolls 18, 20, are driven from the shaft 86 through gears 94, 96, 98 and 100, at the opposite side or end of the machine (see Fig. 3), the two latter gears being secured to rotate respectively with the upper rolls.

Figure 5:
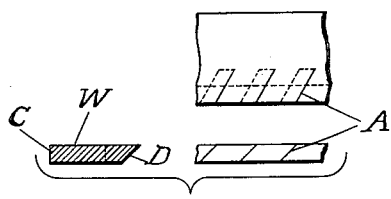
Fig. 5 shows several views of a piece of a slashed welt produced by the machine.
Figure 6:
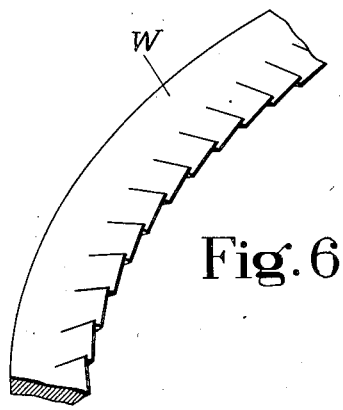
Fig. 6 is a perspective view of the welt.

Welting produced by the machine operating as above described is shown in Figs. 4, 5 and 6. The slashes A extend at an angle to the longitudinal edges of the welt W, i. e. the direction of feed through the machine, both crosswise of the welt and in the direction of its thickness. One edge, C, of the welt is perpendicular to its faces while the other, D, is beveled.

While I have thus indicated the object and nature of the invention and have described in detail one preferred embodiment thereof, it is to be understood that other forms of construction may be employed and various details modified without departing from the spirit and scope of the invention as defined in the following claims.

Having thus described my invention, what I claim as new and desire to secure by Letters Patent is:

1. A machine of the class described comprising a work support, a cutter constructed and arranged to produce a series of slashes between the edges of a sheet of material, in combination with a cutter for subsequently dividing the sheet at an acute angle to its surface along the area so slashed and mechanism for feeding the work transversely of said slashes.

2. A machine of the class described having, in combination, a work support, a cutter constructed and arranged to produce a series of slashes between the edges of a sheet of material, a second cutter for separating the strip thus slashed from the sheet and a third cutter for dividing said strip along the slashed area.

3. A machine of the class described having, in combination, a work support, a plurality of cutters constructed and arranged for producing a series of inclined slashes between the edges of a sheet of material and for subsequently dividing the sheet into a plurality of strips by perpendicular cuts and splitting each strip by an angular cut.

4. A machine of the class described having, in combination, a work support, work feeding means and a plurality of cutters constructed and arranged to produce in a sheet of material a series of slashes inclined in two directions relatively to the line of feed.

5. A machine of the class described having, in combination, a work support, a cutter constructed and arranged to produce a series of inclined slashes between the edges of a sheet of material and an angularly arranged knife for dividing the sheet at an acute angle along the middle of the area so slashed and mechanism for feeding the work transversely of said slashes.

6. A welt making machine having, in combination, a work support, mechanism for feeding continuously a sheet of material over the support, a reciprocating slashing knife, actuating and guiding devices constructed and arranged to vibrate said knife rapidly in a path inclined to said work support to produce a series of inclined slashes between the edges of said sheet and a stationary splitting knife for dividing the sheet along the middle of the area so slashed.

7. A welt making machine having, in combination, a work support, a pair of feed rolls, a series of splitting knives mounted on one of the feed rolls and extending beyond its peripheral surface, a series of slashing knives on the entrance side of the rolls and a series of splitting knives on their exit side.

8. A welt making machine having, in combination, a flat work table, mechanism for feeding continuously a wide sheet of material over the table, a reciprocating crosshead, a series of slashing knives mounted on the crosshead, mechanism for imparting rapid vibratory movements to said crosshead to cause said knives to produce a series of slashed areas in the sheet, a series of rotary stripping knives constructed and arranged to divide the sheet into several rectangular strips, each strip being slashed along its median line, and another series of knives constructed and arranged to divide each strip at an angle along said line.

9. That improvement in the art of making welting which comprises slashing a wide sheet of material between its edges and then dividing it into a plurality of strips by alternate perpendicular and inclined cuts.

10. That improvement in the art of making welting which comprises first slashing a sheet of material between its edges, then dividing the sheet into strips each of a width sufficient for two finished welts and then dividing each strip along the median line of its slashed area.

11. That improvement in the art of making welting which comprises first producing a series of independent rows of slashes in a sheet of material, then dividing the sheet into twice as many welts as there are rows of slashes by alternate perpendicular and inclined cuts.

In testimony whereof I have signed my name to this specification.

THOMAS LUND.